United States Patent [19]

Berger

[11] Patent Number: 5,148,444
[45] Date of Patent: Sep. 15, 1992

[54] TUNABLE SINGLE-FREQUENCY RING LASER

[75] Inventor: Josef Berger, Santa Clara, Calif.
[73] Assignee: Harmonic Lightwaves, Inc., Santa Clara, Calif.
[21] Appl. No.: 234,188
[22] Filed: Aug. 18, 1988
[51] Int. Cl.[5] .......................................... H01S 3/083
[52] U.S. Cl. ......................... 372/94; 372/34; 372/20; 372/12; 372/37; 372/66; 372/75
[58] Field of Search ................ 372/94, 66, 37, 12, 372/20, 75, 34

[56] References Cited

U.S. PATENT DOCUMENTS

| | | | |
|---|---|---|---|
| 3,500,240 | 3/1970 | Kessler . | |
| 3,538,453 | 11/1970 | Miller . | |
| 3,824,492 | 7/1974 | Brienza et al. . | |
| 4,247,832 | 1/1981 | Sanders et al. . | |
| 4,578,793 | 3/1986 | Kane et al. . | |
| 4,739,507 | 4/1988 | Byer et al. | 372/66 |
| 4,747,111 | 5/1988 | Trutna, Jr. et al. | 372/94 |
| 4,749,842 | 6/1988 | Kane et al. | 372/36 |
| 4,764,933 | 8/1988 | Kozlovsky et al. | 372/66 |
| 4,794,615 | 12/1988 | Berger et al. . | |
| 4,797,896 | 1/1989 | Kane . | |

FOREIGN PATENT DOCUMENTS 217159 11/1979 Fed. Rep. of Germany .

OTHER PUBLICATIONS

"Final Report for Coherent Summation of Nd:YAG Lasers," Schwartz Electro-Optics, Inc., Contract DAAH-1-86-C-1070, from Oct. 1, 1986 to Mar. 31, 1987.

"Frequency Stabilized Nd:YAG laser with high output power," K. G. Peng et al. *Applied Optics,* vol. 24, No. 7, Apr. 1, 1985.

"Magnetooptic effects in a YAG:Nd$^{3+}$ ring laser with a nonplanar resonator" Nanii et al., *Sov. J. Quantum Electron,* May 1984, vol. 14, No. 5.

*Primary Examiner*—Léon Scott, Jr.
*Attorney, Agent, or Firm*—Steven F. Caserza

[57] ABSTRACT

A tunable, single-frequency, solid-state ring laser includes a solid-state laser material pumped by laser-diode light and at least one additional external piece which reflects the intra-cavity lasing light in a closed loop such that the plane of polarization is changed in an appropriate amount to compensate for magneto-optic change (Faraday rotation) of the plane of polarization, which occurs either inside the solid-state material or in one of the external pieces which traversed by the intra-cavity lasing beam. At least one of the external elements has the ability to change the optical path length of the intra-cavity lasing beam in order to tune the laser frequency by means of mechanical movement, electro-optic properties, magneto-optic properties, or some combination of the above properties.

154 Claims, 5 Drawing Sheets

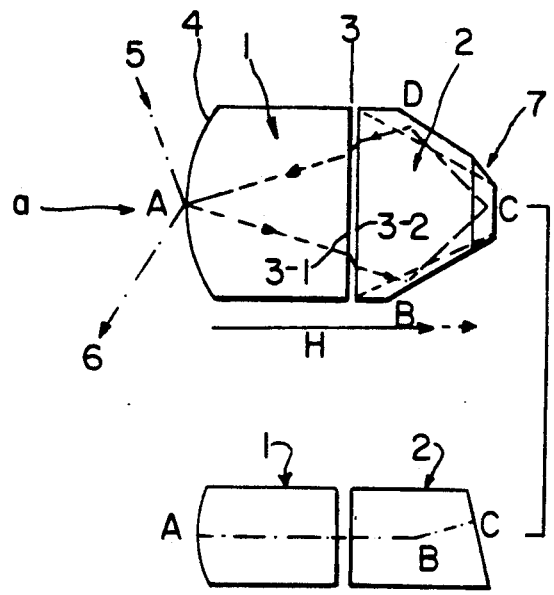
FIG. IA
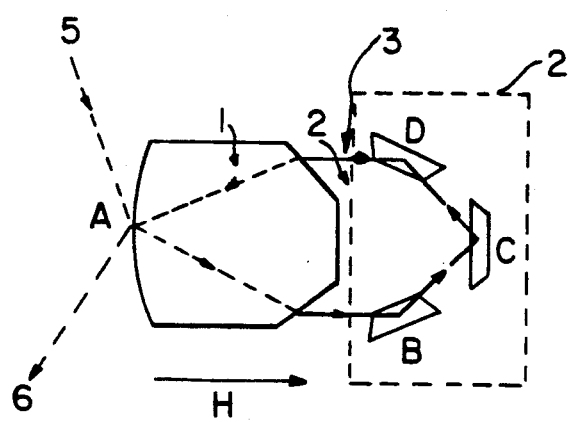
FIG. IB

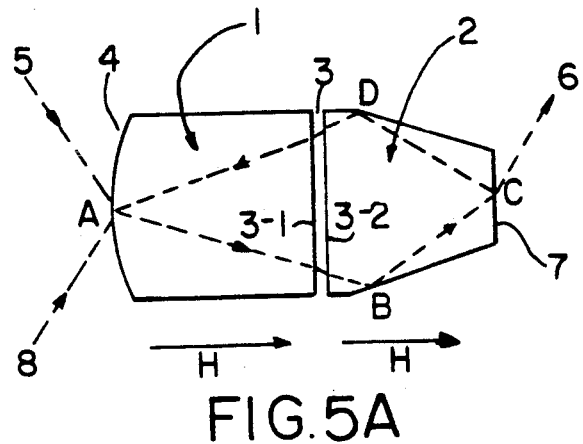
FIG.5A
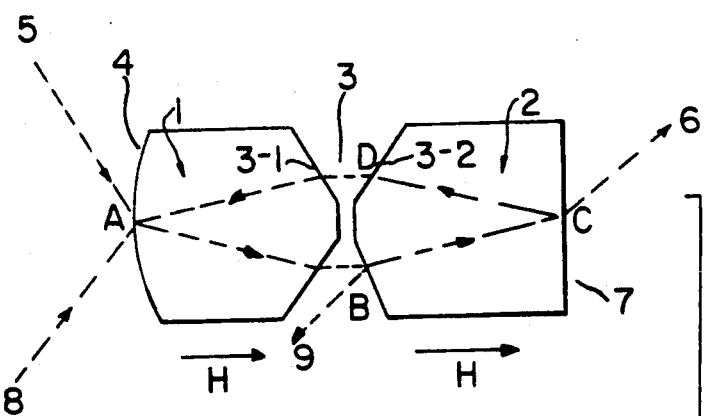
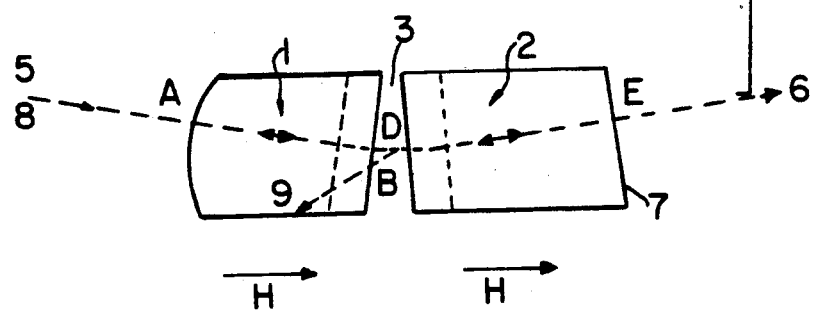
FIG.5B

TUNABLE SINGLE-FREQUENCY RING LASER

BACKGROUND

1. Field of Invention

This invention relates generally to single-frequency ring lasers and more particularly to tunable single-frequency solid-state lasers.

2. Description of Prior Art

Ultra-stable, single-longitudinal-mode lasers are the heart of coherent optical transmitters and receivers in coherent communication. They are also useful as local oscillators in high-powered lasers and laser amplifiers. These lasers are an essential part in coherent optical range finders, designators, sensors, and other measurement instruments. In coherent optical rangefinders, for example, it is very important to force such a laser to oscillate in a purely longitudinal mode and to tune its frequency rapidly over a limited frequency range in order to detect and determine the location and velocity of remote objects, using heterodyne FM-CW chirped techniques. Such techniques are well-known in FM-CW chirped radar applications, and are described in the literature, for example, by Skolnik, *Introduction to Radar Systems*, 2nd ed., Chapter 3, McGraw-Hill, New York, 1980.

Recent developments describe the use of solid-state lasers pumped by semiconductor laser diodes which provide very small, highly efficient, single-mode ultra-stable solid-state lasers. Such solid-state lasers are described, for example, in U.S. Pat. No. 4,578,793; Kane and Byer, "Monolithic, Unidirectional Single-Mode Nd:YAG Ring Laser," Optics Letters 10:65-67 (Feb. 1985); Kane et al., "Frequency Stability and Offset Locking of a Laser-Diode-Pumped Nd:YAG Monolithic Nonplanar Ring Oscillator," Optics Letters, 12:175-177 (March 1987); and Trutna et al., "Unidirectional Diode-Laser-Pumped Nd:YAG Ring Laser with a Small Magnetic Field," Optics Letters 12:248-250 (April 1987).

In the prior art, single-piece, solid-state non-planar as well as quasi-planar, internally reflecting, unidirectional ring lasers pumped by semiconductor lasers, have been shown to emit highly coherent single-frequency laser light. The advantage of the prior-art design configuration is its stability and simplicity due to the use of a single piece of solid-state laser material with magneto-optic properties and polished surfaces that create a unidirectional ring path for the laser beam. The internally reflective surfaces act to change the direction of the linear-polarized lasing light in order to compensate for the plane of polarization change induced by the Faraday rotation due to an externally applied magnetic field. Since the magneto-optic effect is non-reciprocal, the plane of polarization of a beam that traverses the ring in one direction, e.g. counter-clockwise, is designed to be aligned with the original polarized beam after completing one round. On the other hand, the beam which traverses the ring in the opposite direction, e.g., clockwise, increases its polarization rotation each time it completes a round trip in the cavity. A polarization-selective element in the cavity, aligned with the compensated, counter-clockwise, linear-polarized beam, induces differential losses between the two opposite traveling waves. The induced differential loss between the two contra-rotating beams occurs by use of a polarization-selective element, since one of the rotating beams (the clockwise beam in this example) has a plane of polarization which accumulates increasing deviation from the aligned polarizer orientation and thus an increased loss, each time the beam completes a full path within the cavity. On the other hand, for the polarization-compensated beam (in this example, the counter-clockwise beam) the plane of polarization remains aligned with the polarizer orientation, so that the beam does not suffer significant loss. The differential losses reinforce the counter-clockwise beam over the clockwise rotation, thereby creating a unidirectional traveling-wave lasing. The traveling-wave lasing configuration saturates the gain uniformly, thereby eliminating spatial hole-burning that creates multifrequency operation in a linear Fabry-Perot-type cavity. The gain is uniformly saturated since the electric field of the electromagnetic wave is travelling through the pumped volume. This is in contrast to the action in a Fabry-Perot configuration in which stimulated atoms spacially located across the nodes of the standing waves form unsaturated gain, in which case other longitudinal modes having different frequencies tend to oscillate and saturate this unsaturated gain.

The prior-art monolithic design, for example as shown in U.S. Pat. No. 4,578,793, and in Kane and Byer, "Monolithic, Unidirectional Single-Node Nd:YAG Ring Laser," Optics Letters, vol. 10, No. 2 (Feb. 1985), pp. 65-67, gives a highly stable single-frequency laser output. However, the stable monolithic design is inferior when fast frequency tuning is needed. Slow frequency tuning can be applied to the monolithic design by heating or cooling the solid-state lasing material. Fast frequency tuning over a very limited spectral range can be achieved by applying a variable pressure on the lasing material, such as Nd:YAG, using a piezoelectric transducer (PZT). See also A. Owyoung and P. Esherick, Optics Letters, vol. 12, p. 999 (1987), and T. J. Kane, Lightwave Electronics Corporation, Mountain View Calif., "Demonstration of Two Frequency-Locked Ring Lasers," exhibition shown at the Conference on Laser and Electro-Optics, Apr. 26-28, 1988, Anaheim, Calif.

Also known in the prior art is a co-linear pumping technique where a laser diode is tuned to emit light in the exact absorption band of the solid-state laser material, as described, for example, in Kane et al, "Frequency Stability and Offset Locking of a Laser-Diode-Pumped Nd:YAG Monolithic Non-Planar Ring Oscillator," Optics Letters, vol. 12, no. 3 (March 1987), pp. 175-177. The laser diode light is focused on the same axis of the propagating light inside the cavity, colinear with the lasing beam. In the colinear pumping configuration the pumped volume overlaps exclusively with the lowest-order transverse-cavity mode, which gives rise to a lasing of single transverse mode, namely the $TEM_{00}$ gaussian mode. Other prior art, pertaining to monolithic solid-state lasers pumped by laser diodes, is described by Trutna et al., "Quasiplanar Unidirectional Ring Laser," Paper WN2, presented at the Conference on Laser and Electro-Optics, Apr. 26-29, 1987, Baltimore, Md., and by Trutna et al., "Unidirectional, Diode-Laser-Pumped Nd:YAG Ring Laser with a Small Magnetic Field," Optics Letters, vol. 12 (April 1987), p. 248. This design has better performance due to exact compensation of the polarization plan rotation by the total internal reflecting facet of the prism.

SUMMARY

It is an object of the present invention to provide a single-frequency unidirectional ring laser which can be quickly tuned.

It is a further object of the present invention to provide a compact, tunable, single-frequency, solid-state, unidirectional ring laser which can be quickly tuned.

It is yet another object of the present invention to provide a unidirectional, solid-state ring laser in which fast frequency tuning over a large frequency range is accomplished by means of quickly changing the optical path length traversed by the intra-cavity laser beam.

It is yet another object of the present invention to provide an electromechanical, electro-optical and magneto-optical means for changing the unidirectional ring intra-cavity optical-path length in order to achieve rapid frequency tuning over a large laser frequency range.

In accordance with the teachings of the present invention, a compact, solid-state ring laser is provided having a simple design with a minimum of two pieces which form the solid-state laser ring cavity. The two-piece design enables a rapid change of the laser-ring optical path length by applying electrical stimuli to one of the pieces forming the laser-ring cavity. Simple designs utilizing more than two pieces are also taught.

In the first embodiment of this invention, the two pieces forming the laser-ring cavity comprise two different materials that have complimentary properties. The first piece is formed of a solid-state laser material with magneto-optic properties. This first part acts as a lasing medium as well as a Faraday isolator by rotating the plane of polarization of light traversing within. The second piece is a highly transparent, quasi-planar reflector, such as a prism, made out of either low-cost glass, electro-optic material, magneto-optic material or a material having some combination of the above properties. In the case of the simple glass, quasi-planar, reflecting prism, this piece is mounted on a PZT. An applied tunable external voltage on the PZT moves the prism relative to the solid-state laser material, lengthening and shortening the optical path length of the ring and thereby tuning the laser frequency. In one embodiment, the intra-cavity beam is transmitted from piece 1 to piece 2 and back while the beam inclines to surface 3-1 and 3-2 in a Brewster angle, as shown in FIG. 1. Thus, surfaces 3-1 and 3-2 function as intra-cavity polarizers, and therefore these surfaces provide a simple internal polarizer with very low loss that improves the differential loss between the two light beams traversing oppositely within the ring cavity. The polarizer function can also be implemented by utilizing an appropriate polarization-preferred coating or multilayer coatings on surfaces 3-1 and 3-2 of FIG. 1, or by arranging the Brewster angles in any other combination inside the cavity to prefer one polarization over the other.

In a second embodiment of this invention, the second piece forming the laser ring cavity is attached to a PZT, the second piece being made of transparent magneto-optic material with high Verdet constant. Using high-Verdet-constant material enables larger rotation of the plane of polarization within the prism material, thus providing better isolation against the contra-rotating beam and back reflection into the laser ring cavity. Thus the external prism enables a rotation of the polarization plane out of the first piece, which is made of lasing material. The advantage of this embodiment is that a variety of laser materials which do not exhibit strong magneto-optic properties can now be used to form ring lasers in accordance with the teachings of this invention, thus allowing the emission of the lasers of this invention to be turned within a broader frequency spectrum than possible in the prior art.

A variation of this embodiment provides that both pieces have magneto-optic properties, thus allowing polarization rotation both inside and outside the lasing material. This enables much larger Faraday rotation of the plane of polarization, thus increasing the differential loss between the two contra-rotating beams transversing within the laser cavity. This increase in the isolation against external reflections is necessary since these reflections can be undesirably amplified in the opposite direction inside the ring, utilizing the gain arbitrarily, thus inducing intensity and correspondly frequency noise on the unidirectional laser beam.

In a third embodiment of this invention, the reflecting piece is made of an electro-optic material in which an applied voltage changes the refractive index along the direction of propagation of the light beam, thus varying the total optical-path length within the laser-cavity. This embodiment has the advantage that no mechanical movement is applied to the second piece. The first and second pieces can be attached together, for example, by means of optical cement, in order to prevent relative movement between the two pieces.

In a fourth embodiment of this invention, the second part is made of a magneto-optic material. When a variable magnetic field is applied to the second part, the magneto-optic properties cause a light beam having circular polarization which propagates in the second piece to change its phase, thus creating optical-path variations. The circular polarization of the light beam within the second piece is created by an additional quarter-wavelength plate located between the first and the second pieces. This quarter-wavelength piece can, if desired, be attached to the second or first piece. If desired, all the pieces can be attached together, for example by means of optical cement, in order to prevent relative movement.

In a fifth embodiment of this invention, the second piece is made of material (e.g., a birefringent material) where applied variable external pressure changes the refractive indices of the material along a preferred axis, thereby changing the optical-path length of the laser cavity. Such pressure can be applied by an attached piezo-electric transducer (PZT), or by other suitable means. Preferably, the external prism material itself can consist of a piezo-electric material which is transparent in the lasing spectrum, allowing a variable electric potential to be applied directly to the prism material in order to change its physical dimension slightly, thus enabling a rapid change of the optical-path length of the laser beam in the cavity. Two embodiments of this invention generalize the ways light is coupled out of the cavity and the ways pump light is coupled into the cavity.

In the general embodiment a combination of the above embodiments can be implemented to enable pure single-frequency tuning while preserving the unidirectional and single-polarization lasing properties.

BRIEF DESCRIPTION OF THE DRAWINGS

FIG. 1a is a diagram of one embodiment of a two-piece, frequency-tunable, unidirectional ring resonator constructed in accordance with the teachings of this invention.

FIG. 1b depicts the implementation of the embodiment of FIG. 1a using three external mirrors, where at least one of the mirrors is movable.

FIGS. 5a and 5b are simplified schematic representations of another embodiment of this invention which generalize the way laser light is coupled out of the tunable unidirectional ring laser and how the sequence of reflection, refraction, and rotation is implemented.

DESCRIPTION OF PREFERRED EMBODIMENTS

Figure 2A:
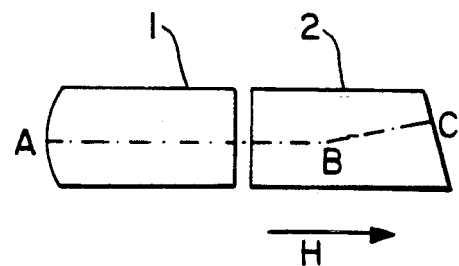
FIG. 2a depicts the operation of one embodiment of the structure of FIG. 1 where the first piece is made of non-magneto-optic lasing material, the second piece is made of magneto-optic material, and the magnetic field applied to the second piece only.

FIG. 1a is a simplified schematic representation of a first embodiment of a laser constructed in accordance with this invention. In this embodiment, piece 1 comprises lasing material and piece 2 serves as the quasi-planar reflecting prism. Of importance, gap 3 exists between piece 1 and piece 2, with piece 1, piece 2 and gap 3 forming the ring cavity. Surfaces 3-1 and 3-2 adjacent gap 3 are polished and serve as partial polarizers of the light beams passing within the laser cavity. Surface 4 of piece 1 serves as the output mirror of the ring laser. As shown in FIG. 1a, energy from a pump source is applied as a light beam 5 and an output laser beam is provided along line 6. Piece 2 includes three surfaces which change the plane of polarization of the intra-cavity light beam by reflecting this beam at points B, C, and D, out of the plane ABD, as shown in the side view of FIG. 1a. The applied magnetic field is shown as vector H. Faraday rotation of the plane of polarization is performed inside the magneto-optic lasing material, such as Nd:YAG, by applying a magnetic field as described. The beam is inclined in a Brewster angle to surfaces 3-1, 3-2 facing gap 3, and thus there is minimal loss for the polarization component in plane ABD. Therefore polarization in plane ABD is preferred in the lasing.

Piece 2 is a prism polished to reflect the intra-cavity beam in a quasi-planar path while changing its plane of polarization to compensate for the Faraday rotation which occurs inside piece 1. Piece 2 is attached to an electromechanical transducer (not shown), such as a PZT. When electrical voltage is applied to the electromechanical transducer, piece 2 changes its position relative to piece 1, thus changing the optical path length traversed by the intra-cavity light beam. The pump energy is applied by, for example, a laser diode tuned to the absorption band of the solid-state lasing material via output mirror 4. Output mirror 4 has an antireflecting coating in the pump energy regime and a high reflecting coating in the lasing spectral regime, thereby coupling only a small portion of the intra-cavity light to the outside of the cavity. The multilayer coating can be designed to act as a partial polarizer in order to create lasing in a preferred polarization. The coating can also be designed to introduce a known polarization change to the reflected intra-cavity lasing beam, thus again compensating the Faraday rotation in one direction of rotation, thereby increasing the differential loss between the two counter-rotating beams. In this case surfaces 3-1, 3-2 near gap 3 can be polished at an angle which enables different transmission angles of the beam traversing from piece 1 to piece 2 and back. This is needed when parallel beams are desired to be transferred from piece 1 to piece 2, for example, by way of a retardation plate, which are commercially available. An antireflecting coating applied to surfaces 3-1, 3-2 can also be designed to act as a partial polarizer for either one of the beam polarizations. Both the laser diode and the lasing material are mounted on a thermoelectric cooler, or any other heat stabilizer, to enable adjustment of their emission spectra, as is well known in the art. The curvatures of surface 4 are designed to form the desired transverse-mode shapes inside the laser cavity. If desired, different curvatures can be used for the two axes of symmetry, or a single curvature for both axes can be used for simplicity.

Without losing generality, piece 2 can be mounted to more than a single electro-mechanical transducer to adjust other degrees of freedom, and the movement can also be supplied to piece 1 of the solid-state lasing material by attaching it to one or more electromechanical transducers (such as PZTs) while holding piece 2 constant or, in another form of relative movement, applying mechanical movement to both piece 1 and piece 2.

The output light is coupled out from the cavity either directly through an antireflection coating or a Brewster-mounted window, or coupled to an optical fiber using one or more lenses in the path of output beam 6. If desired, a prism can be used to correct for astigmatism caused by output coupling mirror 4 of the laser. If desired, both the output light of the diode laser and the solid-state laser are monitored by photodiodes (not shown) to provide control signals to allow for closed-loop intensity stabilization.

Without losing generality, the function of the above-described piece 2 in the embodiment of FIG. 1a can be implemented using three tilted mirrors mounted to reflect the light in a ring configuration at points B, C, and D, while one or more of the mirrors are attached to an a electro-mechanical transducer to allow mirror movement and thus enable optical path tuning by external means, as seen in FIG. 1b.

Figure 2B:
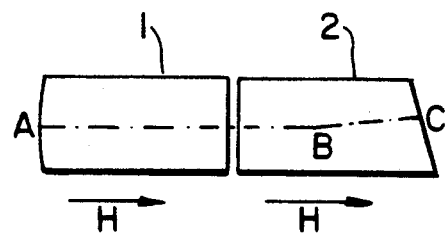
FIG. 2b depicts the operation of another embodiment of the structure of FIG. 1 where both pieces are made of magneto-optic material and the magnetic field is applied to both pieces.

FIGS. 2a and 2b are simplified schematic representations of alternative embodiments of this invention. Since the embodiments of FIGS. 2a and 2b are similar to the embodiment of FIG. 1a, only the main differences from the embodiments of FIG. 1 are described. In the embodiment of FIG. 2a the Faraday rotation of the plane of polarization is performed outside the lasing material of piece 1, i.e. in the quasi-planar retro-prism of piece 2. The prism of piece 2 is made of magneto-optic material (such as Hoya FR-5 glass) transparent in the lasing wavelength of the solid-state laser material. The same electromechanical approach as in the embodiment of FIG. 1a is used in order to tune the optical-path length of the cavity and thus the laser frequency.

FIG. 2b depicts an embodiment where both the lasing material and the retro-prism of piece 2 have magneto-optic properties. In this embodiment, Faraday rotation is applied to the plane of polarization in both piece 1 and piece 2.

Figure 3:
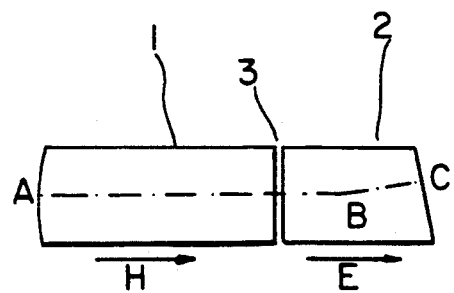
FIG. 3 depicts the operation of yet another embodiment of the structure of FIG. 1 where lasing-material piece 1 is made of magneto-optic material and piece 2 is made of an electro-optic material.

FIG. 3 is a simplified schematic representation of another embodiment of this invention. In this embodiment, Faraday rotation occurs in the lasing material of piece 1, where piece 2 is made of an electro-optic material aligned such that applied external voltage changes the index of refraction along the propagation direction of the intra-cavity light beam, thus tuning the effective optical path length seen by the lasing light. In FIG. 3, piece 2 is attached to piece 1 by means of optical cement or can be separated with Brewster-angled planes. Without loosing generality, piece 2 can be constructed from an electro-optic material attached to a magneto-optic material, thus performing the Faraday rotation as well as the path-length tuning outside of the lasing material of piece 1, or combined with a magneto-optic laser material serving as piece 1, as described in the embodiment of FIGS. 2a and 2b. The more detailed descriptions of the embodiments of FIG. 1 are also applicable to this embodiment.

FIG. 4a is a simplified schematic representation of another embodiment of this invention, in which the static Faraday rotation occurs in the lasing material of piece 1. Quarter-wave plate 41 is mounted between piece 1 (the lasing material) and the magneto-optic material of piece 2, which serves to convert the linearly polarized light beam coming from piece 1 to a circularly polarized light beam transferred to piece 2. The applied variable magnetic field changes the phase of the light in piece 2, thus changing the total optical-path length traversed by the lasing beam, thereby creating a frequency change of the laser light. When the light is reflected back from piece 2, towards piece 1 the beam passes once again through the quarter-wave plate 41, and thus becomes linearly polarized. In this way the laser output power is linearly polarized when coupled out of piece 1 at point A, and is circularly polarized when coupled out from piece 2 at point C. In a variation of this embodiment the variable magnetic field is applied to piece 2 together with a static magnetic field that creates constant polarization change that compensates for the Faraday rotation created inside piece 1. The constant polarization change can also be implemented in piece 2 by using the quasi-planar reflector design for piece 2. When non-magneto-optic lasing material is used for piece 1, a combination of constant magnetic field together with a variable magnetic field operating on piece 2 can be used to create both the constant Faraday rotation for the unidirectional operation together with the alternating magnetic field which tunes the lasing frequency. As in the embodiment of FIG. 2, an additional existing or induced either static or dynamic birefringent property in one or more of the pieces can enhance the optical path change thus inducing larger frequency change.

FIG. 5a is a simplified drawing depicting another embodiment of this invention. It depicts certain ways in which the laser light may be coupled out of the tunable unidirectional ring laser. The output coupling techniques depicted in FIG. 5a can be applied to each of the previous embodiments described. In the embodiment of FIG. 5a, surface 7 of piece 2 serves as the output coupling mirror of the ring laser. The light is coupled out from the laser along path 6 from point C. This coupling scheme becomes possible in this invention due to the use of a new non-reciprocity scheme where the new sequence is MIRROR-FARADAY ROTATION-MIRROR-FARADAY ROTATION-MIRROR as shown in FIG. 5a, thus: INTERNAL REFLECTIVE MIRROR B-FARADAY ROTATION-MIRROR C (not internally reflective and serving also as a coupling output)-FARADAY ROTATION-INTERNAL REFLECTIVE MIRROR D. It is important to understand fully the difference in this invention over the prior art in this important point. In this invention the mirror reflections which bend the light beam path out-of-plane occur prior to the Faraday rotations, in contrast with previous art where the Faraday rotation occurs prior to the mirror reflections: FARADAY ROTATION-MIRROR-FARADAY ROTATION-MIRROR-FARADAY ROTATION-MIRROR-FARADAY ROTATION (as described in U.S. Pat. No. 4,578,793).

FIG. 5b is a simplified schematic representation of another embodiment where the out-of-plane rotation is performed by out-of-plane REFRACTIONS in points B and C instead of total internal reflections as described in FIG. 5a. Here the sequence is REFRACTION B-FARADAY ROTATION-MIRROR C-FARADAY ROTATION-REFRACTION D. The improvements of FIGS. 5a and 5b are as follows:

1. The middle mirror need not be a total internal reflection mirror, thus allowing extraction of the laser beam out of the cavity at a smaller angle with reduced astigmatism.

2. Complete cancellation of the Faraday rotations and the reciprocal rotations between the planes of incidence of the middle mirror and the other two mirrors is made possible by the topology which results in improved isolation.

Alternatively, the light can be coupled out of the laser at either points B or D (depending on the direction of rotation of the light beam) by utilizing a partially reflective surface at refraction point B or D, respectively, and a fully reflective mirror at point C (as shown in FIG. 5b). The advantage of causing the output light from the laser to emanate from points B or D is that another pumping source can be added to pump the laser material of piece 1 in the direction designated as path 8, thus increasing the pumping power. Alternatively, the output light can be coupled out by inserting a partially reflecting mirror in space 3 of FIG. 5a, or as shown schematically in FIG. 5b, by polishing the surfaces in a tilted manner so that part of the light is reflected out of the cavity along path 9 in FIG. 5b. By applying appropriate polarization selective coatings, the output coupling mirror can suppress unwanted polarization components circulating in the cavity.

Figure 4:
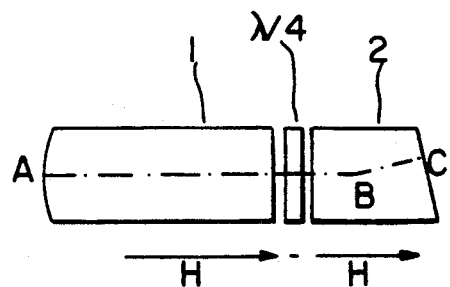
FIG. 4 depicts the operation of yet another embodiment of the structure of FIG. 1 where piece 1 is made of magneto-optic material and where the linear-polarized light is converted to circular polarization by the use of a quarter-wavelength plate.

FIGS. 5a and 5b, and also FIG. 4, describe another completely new embodiment of this invention. Here the out-of-plane total internal reflections or the out-of-plane total internal refractions at points B and D are designed with the correct tilt to act as elliptical retarders in the general case. Here we make use of elliptical retarders in conjunction with Faraday non-reciprocal rotators, inversions and reciprocal rotations, and polarizers to generate non-reciprocal frequency shifts and differential losses between the two counter-propagating circulations. Prior-art designs are based on linear polarization which is only effective in generating differential losses.

The improvement due to separating the two circulations in frequency is improved suppression of the circulation with the higher losses, by reduction of the stray coupling between the circulations due to the frequency mismatch. The stray coupling between circulations is due to scattering of light in the ring path, and also due to small back-reflections of the output beam back into the laser which feed back into the other circulation. The separation of the two frequencies is accomplished in piece 2 by a constant Faraday rotation, and the frequency tuning is accomplished by an additional alternating magnetic field. Piece 1 can act as an additional Faraday isolator when the lasing material has magneto-optic properties. FIGS. 5a and 5b also show another new embodiment with a structure comprising two parts: (1) The first part (piece 1) generates non-reciprocal differential losses between the two counter-propagating circulations making use of linear polarizers (in between the pieces or surface 3-1), Faraday rotations, and inversion and reciprocal rotations. (2) The second part (piece 2) makes use of circular retarders in conjunction with Faraday non-reciprocal rotators and inversions and reciprocal rotations, to generate non-reciprocal frequency shifts between the two circulations.

In another embodiment of the invention, the differential-loss generating part is the same piece in which the laser-gain action and Faraday isolation occurs, and the second part which generates the frequency shift is either (1) a second single-piece material or (2) a second single-piece material in conjunction with a third piece (a discrete quarter-wave plate) in between (see FIG. 4).

Yet another embodiment makes use of the above-described embodiments which are based on circular or elliptical light propagation, to also achieve frequency tuning by varying the magnetic field to vary the amount of Faraday rotation.

Yet another embodiment makes use of the above described embodiments to achieve all three effects: (1) differential loss between the two lowest loss counter-propagating polarizations states; (2) frequency separation between those polarizations states; and (3) frequency tuning between those polarizations states. This results in a tunable single frequency unidirectional laser.

Yet another embodiment exists in which the ability to tune frequency is obtained by one or a combination of the following: (1) magneto-optic tuning (applying variable magnetic field); (2) opto-mechanical tuning (inducing relative displacement between the two pieces); (3) elasto-optic tuning applied to some or all of the individual pieces (changing the refractive index by the applied pressure; and (4) electro optic tuning (applying variable electric field to change the optical path length inside the cavity).

Novel aspects of this invention include the following:
 1. Separation of laser gain and non-reciprocal isolation in different pieces.
 2. Use of linear polarizers at the interfaces between the pieces to act as a differential polarization loss elements:
   2.1 Brewster polarizers.
   2.2 Coating polarizers, which discriminate between the two polarizations upon tilted incidence.
 3. The combination of reciprocal rotation and inversion (of the polarization state with respect to a transverse axis) which is essential for the non-reciprocal operation is achieved by:
   3.1 At least two out of plane REFRACTIVE bends, and at least one reflective bounce.
   3.2 At least three REFLECTIVE out of plane bounces.
 4. The combination of reciprocal rotation and inversion as described in both cases in 3, above, makes use of a topology in which the optical path follows the new sequence REFRACTION-FARADAY ROTATION-MIRROR-FARADAY ROTATION-REFRACTION (for the case 3.1) or MIRROR-FARADAY ROTATION-MIRROR-FARADAY ROTATION-MIRROR (for the case 3.2) in which the mirror bounces which bend the ray path occur prior to the Faraday rotations, in contrast with prior art where the Faraday rotation occurs prior to the mirror bounces: (FARADAY ROTATION-MIRROR-FARADAY ROTATION-MIRROR-FARADAY ROTATION-MIRROR-FARADAY ROTATION (in U.S. Pat. No. 4,578,793).

Some of the improvements made available by the invention are:
 1. The middle mirror need not be a total internal reflective mirror, thus allowing extraction of the laser beam out of the cavity at a smaller angle with reduced astigmatism.
 2. Complete cancellation of the Faraday rotations and the reciprocal rotations between the planes of incidence of the middle mirror and the other two mirrors is made possible by the topology which results in improved isolation.
 3. Use of elliptical retarders in conjunction with Faraday non-reciprocal rotators and inversions and reciprocal rotations, and polarizers to generate non-reciprocal frequency shifts and differential losses between the two counter-propagating circulations. Prior-art designs are based on linear polarization which is only effective in generating differential losses. The improvement due to separating the two circulations in frequency is improved suppression of the circulation with higher losses, by reduction of the stray coupling between the circulations due to the frequency mismatch. The stray coupling between circulations is due to scattering of light in the ring path, and also due to small back-reflections of the output beam back into the laser which feed back into the other circulation.
 4. Embodiment of some of the elements mentioned in 5, above, in particular the elliptical retarders as total internal reflections in a single piece out of the two or more pieces described above.
 5. A structure comprising two parts:
   (a) One part generates non-reciprocal differential losses between the two counter-propagating circulations making use of linear polarizers, Faraday rotations, and inversion and reciprocal rotations.
   (b) The second part makes use of circular retarders in conjunction with Faraday non-reciprocal rotators and inversions and reciprocal rotations, to generate non-reciprocal frequency shifts between the two circulations.
 6. An embodiment of the differential-loss generating part of as one piece where the laser gain action occurs, and the second part which generates the frequency shift is either a second single piece material or a second single piece material in conjunction with a third piece in between: a discrete quarter-wave plate.
 7. Making use of the embodiments 5,6,7,8 which are based on circular or elliptical light propagation, to achieve frequency tuning by varying the magnetic field to vary the amount of Faraday rotation.

Figure 6A:
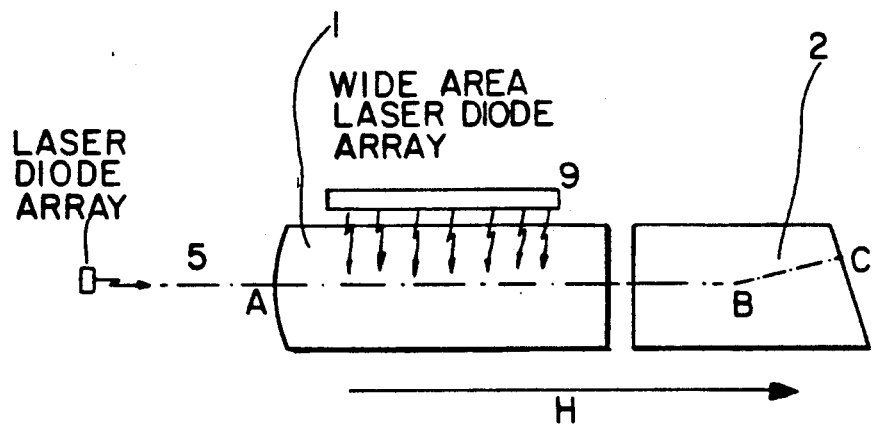
FIGS. 6a and 6b are a simplified schematic representations of another embodiment of this invention which generalize the way pump light is coupled into the cavity.

8. Use of embodiments 5,6,7,8 to achieve all three effects:
   (a) Differential loss between the two lowest loss counter-propagating polarizations states.
   (b) Frequency separation between those polarizations states.
   (c) Frequency tuning between those polarizations states. This results in a tunable single frequency unidirectional laser.
9. Tunability (of frequency) is obtained by either or a combination of:
   (a) Magneto-optic tuning (applying variable magnetic field)
   (b) Opto-mechanical tuning (inducing relative displacement between the two pieces).
   (c) Elasto-optic tuning applied to some or all of the individual pieces FIG. 6a describes another embodiment of this invention which generalizes the way pumped light can be applied to the lasing material of piece 1. In FIG. 6a high-power, broad-area laser diode or laser-diode arrays 9 are utilized to pump the lasing material of piece 1 from its side. This enables greater pump power to be coupled into the laser cavity, either by pulse operation or CW. When the unidirectional ring laser operates continuously in a single-frequency mode due to the end pumping, this existing frequency will force the laser to continue to oscillate in a single-frequency mode when higher pump power is applied from its side. This is similar to an injection locked phenomenon known in the prior art.

Figure 6B:
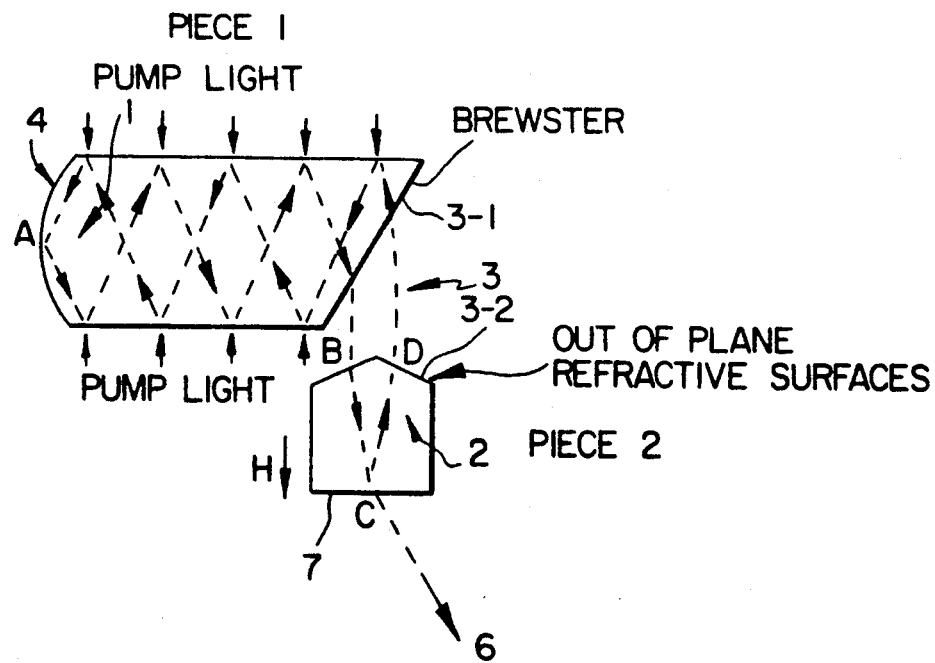

FIG. 6b shows another embodiment where larger power can couple to the ring laser by using the zig-zag laser configuration in conjunction with the ring configuration to create high power diode pumped tunable unidirectional single mode ring solid state laser. The advantage of this configuration is that at each reflection a pumped light from laser diode or laser diode array can be matched with the intra-cavity beam, this give high efficiency of pumping. In the lasing material the light travels in a zig-zag path and is coupled to the second piece which functions according to the different combinations of the above described embodiments.

In any of the above-described alternative embodiments, instead of only a static magnetic field a combination of static and dynamic magnetic fields are applied in order to operate the magneto-optic material in the unsaturated magneto-optic regime. In this way, a small variation of the plane of polarization of the lasing beam is created, thereby inducing a small optical path length change due to existing birefringent properties of either the lasing material of piece 1 or piece 2, or any additional piece inserted in the cavity. The above birefringent properties of either piece 1, piece 2, or any additional piece can also be induced in a material by pressing either one of the pieces or both constantly or alternating. The more detailed descriptions of FIG. 1a are also applicable to this embodiment.

All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be practiced within the scope of the appended claim.

What is claimed is:

1. A non-monolithic laser resonator comprising:
   a first piece;
   a second piece, separated by a gap of width Wg from the first piece;
   at least one of said first and second pieces being a material capable of lasing;
   at least one of said first and second pieces being a material capable of producing Faraday rotation of an optical beam traveling therein;
   means for defining, within a region consisting of the first and second pieces and the gap between these two pieces, a resonant unidirectional ring that includes either:
      at least four reflection vertices comprising:
         a first reflection vertice in said first piece; and
         a first and second refraction at the interface between said first and second pieces, such that said first refraction is located closer to said second reflection vertice than said second reflection vertice is to said fourth reflection vertice, and such that said second refraction is located closer to said third reflection vertice than said third reflection vertice is to said fourth reflection vertice; or at least two out of plane refraction and two reflection vertices;
   input means for receiving an input beam of light into said ring to pump the laser; and
   output means for extracting an output laser beam from light in said unidirectional ring.

2. The laser resonator of claim 1 further characterized in that said first piece comprises a material capable of lasing.

3. The laser resonator of claim 2 further characterized in that said first piece comprises a laser material having magneto optic properties capable of producing Faraday rotation of an optical beam traveling therein.

4. The laser resonator of claim 2 further comprising means for applying a magnetic field substantially in the direction defined mainly along the optical beam propagating within said ring in a substantial part of the beam path inside at least one of said first or second pieces to decouple counter propagating optical beams.

5. The laser resonator of claim 1 wherein said output means for extracting an output laser beam further comprises:
   an output mirror formed as part of said first or second pieces, said output mirror comprising an antireflection coating to allow said input beam of light to be coupled into said ring; and
   a coating which is highly reflective in the lasing light spectrum.

6. The laser resonator of claim 1 which further comprises a polarization selectivity coating to maximize cavity loss for a first polarization and maximum optical power output for a second polarization.

7. The laser resonator of claim 1 further characterized in that said second piece comprises a non laser material.

8. The laser resonator of claim 7 further characterized in that said second piece comprises a non laser material having magneto optic properties capable of producing Faraday rotation of an optical beam traveling therein.

9. The laser resonator of claim 7 further comprising means for applying a magnetic field substantially in the direction defined mainly along the path of the optical beam propagating within said ring in a substantial part of the path of the optical beam inside said second piece to decouple counter propagating light beams.

10. The laser resonator of claim 1 further comprising means for varying the optical path length of said ring laser.

11. The laser resonator of claim 10 wherein said means for varying the optical path length comprises means for varying the width Wg of said gap.

12. The laser resonator of claim 11 wherein said means for varying the width Wg of said gap comprises a piezo electric transducer coupled to either said first or second piece.

13. The laser resonator of claim 12 wherein said means for varying the width Wg of said gap changes the optical path length of said ring thereby tuning the laser frequency.

14. The laser resonator of claim 1 further comprising means for generating a variable magnetic field for magneto-optic frequency tuning.

15. The lager resonator of claim 14 wherein said magneto-optic frequency tuning is achieved by applying a variable magnetic field along the path of said optical beam to change the Faraday rotation acting on an elliptically polarized optical beam thereby changing the optical path length of a rotating optical beam relative to a counter-rotating optical beam.

16. The laser resonator of claim 15 wherein said second piece comprises highly transparent material having a high Verdet constant and said frequency tuning of an elliptically polarized optical beam occurs in said second piece.

17. The laser resonator of claim 14 wherein said means for generating a variable magnetic field provides magnetic flux along the path of said optical beam, said magnetic flux being tuned by changing the strength of the magnetic field or changing the location of said means for generating a magnetic field relative to said magneto optic material.

18. The laser resonator of claim 17 further comprising electro mechanical means to cause said change of location.

19. The laser resonator of claim 18 wherein said electro mechanical means comprises a Piezo Electric Transducer.

20. The laser resonator of claim 1 further comprising an Electro-Optic frequency tuning element.

21. The laser resonator of claim 20 wherein said Electro-Optic frequency tuning element serves as part of said ring, and said laser resonator further comprises means for applying an adjustable electric field to said Electro-Optic frequency tuning element in order to change the optical path length of said ring thereby tuning said laser frequency.

22. The laser resonator of claim 21 wherein one of said first and second pieces comprises non-lasing material comprising an Electro-Optic frequency tuning element, whereby an applied electrical field changes the optical path length of said ring in the region traversed by an elliptically polarized optical beam, thereby changing the state of polarization of said optical beam and tuning the frequency of said optical beam.

23. The laser resonator of claim 1 further comprising an Elasto-Optic frequency tuning element.

24. The laser resonator of claim 23 wherein said Elasto-Optic frequency tuning element forms part of said ring and said laser further comprises means coupled to the said ElastoOptic frequency tuning element for receiving an electric field and in response thereto stressing said Elasto-Optic frequency tuning element, thereby changing the path length of said ring, thereby tuning said laser frequency.

25. The laser resonator of claim 24 wherein said laser material also has elasto-optic properties and serves as said Elasto-Optic frequency tuning element.

26. The laser resonator of claim 24 wherein one of said first and second pieces comprises non-lasing material comprising an Elasto-Optic frequency tuning element, whereby an applied electrical field changes the optical path length of said ring in a region traversed by an elliptically polarized optical beam, thereby changing the state of polarization of said elliptically polarized optical beam and tuning the frequency of said laser.

27. The laser resonator of claim 26 wherein said Elasto-Optic frequency tuning element further comprises an electro-mechanical material such that an applied electric field tunes the refractive index of at least one of its optical axes thereby tuning the optical path length of said ring.

28. The laser resonator of claim 1 wherein said at least four non-coplanar reflection vertices comprise:
two out-of-plane total internal reflections;
one reflection or total internal reflection, located between said two out-of-plane total internal reflections, acting as a retardation plate; and
one partial reflection mirror that serves also as an output coupler.

29. The laser resonator of claim 28 wherein:
said two out-of-plane total internal reflections and said reflection or total internal reflection located between said two out-of-plane total internal reflections define a first plane; and
said two out-of-plane total internal reflections and said partial reflection mirror define a second plane inclined to said first plane with a minor angle less than approximately 20 degrees.

30. The laser resonator of claim 1 wherein said at least two refraction and two reflection vertices comprise:
two out-of-plane refractions;
one reflection, located between said two out-of-plane refractions, acting as a retardation plate; and
one partial reflection mirror, located in the path of said optical beam between said two out-of-plane refractions, that also serves as an output coupler.

31. The laser resonator of claim 30 wherein:
said two out-of-plane refractions and said internal reflection located between said two out-of-plane refractions define a first plane; and
said two out-of-plane refractions and said partial reflection mirror define a second plane inclined to said first plane with a minor angle less than approximately 20 degrees.

32. The laser resonator of claims 29 or 31 wherein said second plane defines a beam path wherein a light beam is linearly polarized and the Faraday rotation acting upon the light beam rotates the plane polarization of a counter-rotating light beam to create an accumulation of rotation of the plane of polarization of said counter-rotating light beam while the Faraday rotation cancels the rotation of the plane of polarization of a rotating light beam induced along its path in said first plane.

33. The laser resonator of claim 32 wherein said creation of accumulation of rotation of the plane of polarization of said counter-rotating beam of light and canceling the rotation of the plane polarization of said rotating beam of light create a differential loss between said rotating and counter-rotating beams of light by aligning the plane of polarization of said rotating beam of light with the higher reflection orientation of said partial reflection mirror.

34. The laser resonator of claim 32 wherein gout creation of accumulation of rotation of the plane polarization of said counter-rotating beam of light and canceling the rotation of the plane polarization of gout rotating beam of light create a differential loss between said rotating and counter-rotating beams of light by aligning the plane of polarization of gout rotating beam of light with the higher transmission direction of one or more intra-cavity polarizing elements.

35. The laser resonator of claim 34 wherein said one or more intra-cavity polarizing elements comprise Brewster surfaces facing said gap.

36. The laser resonator of claim 1 wherein a unidirectional optical beam is achieved by suppression of a counter-rotating optical beam by arranging the polarization modifying elements in said first and second pieces in the following sequence:

| | |
|---|---|
| first: | Partial reflection output mirror and polarizer |
| second: | Faraday rotation |
| third: | Refraction |
| fourth: | Faraday rotation |
| fifth: | Reflection |
| sixth: | Faraday rotation |
| seventh: | Refraction |
| eighth: | Faraday rotation |

37. The laser resonator of claim 36 wherein said gap is located in regions defined before the third and after the seventh sequences.

38. The laser resonator of claim 37 wherein gout gap further comprises a polarizing element.

39. The laser resonator of claim 38 wherein said polarizing element comprises a Brewster surface.

40. The laser resonator of claim 1 wherein said means for receiving an input beam of light comprises a front face of said first piece having a high reflectivity at the lasing wavelength and low reflectivity at the wavelength of said input pump light and through which output coupling is effected at a reflection point of said ring and input light is collinearly coupled to end pump said laser.

41. The laser resonator of claim 1 wherein said input means comprises one or more semiconductor laser diodes or semiconductor laser diode arrays providing said input beam of light in the laser pumping spectral regime.

42. The laser resonator of claim 1 further comprising a semiconductor laser diode or semiconductor laser diode array arranged to pump said laser.

43. The laser resonator of claim 42 wherein said semiconductor laser diode or laser diode array provides pump light coupled into said laser collinearly with said optical beam via at least one of said vertices.

44. The laser resonator of claim 42 wherein said optical beam travels in a zig zag path in said laser material, said laser material provides a multiplicity of reflection points, and said pump light is coupled collinearly with said optical beam at said reflection points.

45. The laser resonator of claim 44 wherein at least some part of said reflection points are located at intervals which match the intervals between the emitting facets of a plurality of broad area laser diodes or laser diode arrays.

46. The laser resonator of claim 42 wherein said pump light from said laser diode or lager diode array is coupled collinearly with said optical beam through at least one of gout vertices and additional pump light is coupled non-collinearly with said optical beam.

47. The laser resonator of claim 42 wherein part of said pump light is coupled continuously to maintain above threshold lasing and additional pulsed pump light is coupled to said ring to provide a high peak output power.

48. The laser resonator of claim 42 further comprising temperature control means for adjusting and stabilizing the emitting spectrum of said laser diode or laser diode array to the absorption band of said lasing material.

49. The laser resonator of claim 1 further comprising temperature control means for adjusting and stabilizing the emitting spectrum of said lasing material.

50. The laser resonator of claims 48 or 49 wherein said temperature control means comprises a Thermo-Electric cooler.

51. The laser resonator of claim 1 wherein said output means for extracting an output laser beam comprises one or more reflection or refraction vertices where said laser light is coupled out of the ring.

52. The laser resonator of claim 1 wherein said first piece is placed adjacent to second piece.

53. The laser resonator of claim 52 wherein said gap is filled with a third material having an index of refraction selected to minimize loss.

54. The laser resonator of claim 53 wherein said third material comprises optical cement.

55. The laser resonator of claim 1 wherein said second piece comprises a plurality of separate pieces.

56. The laser resonator of claim 55 wherein said plurality of pieces comprise tilted mirrors which form a noncoplanar or a planar ring resonator.

57. The laser resonator of claim 1 further comprising one or more frequency tuning elements selected from the group of frequency tuning elements consisting of magneto optic, electro optic, elasto optic, thermal, and mechanical tuning elements.

58. A solid state non-monolithic unidirectional ring laser, for providing a single frequency laser beam comprising:
a first piece comprising a material capable of lasing;
a second piece, separated by a gap of width Wg from said first piece, said second piece comprising non-lasing material having magneto-optic properties capable of providing Faraday rotation of an optical beam travelling therein;
means for defining, with a region consisting of said first and second pieces and said gap, a resonant unidirectional ring comprising at least four non-coplanar vertices, which serve to modify the state of polarization of said optical beam, comprising: either;
at least two refraction vertices and two reflection vertices; or
at least four reflection vertices;
means for achieving unidirectional single frequency lasing by enhancing the loss of a counter-rotating optical beam comprising:
means for causing Faraday rotation on a substantially nonlinearly polarized optical beam in said second piece such that said Faraday rotation has a significantly greater effect on said substantially nonlinearly polarized optical beam than on a substantially linearly polarized optical beam, thereby enhancing frequency separation between a rotating optical beam and said counter rotating optical beam;

transforming means to convert an elliptically polarized optical beam to a linearly polarized optical beam and vice versa; and at least one selective element to discriminate against said counter-rotating optical beam having different polarization and/or frequencies;

means for generating a magnetic field to activate Faraday rotation in said pieces;

output means for extracting an output laser beam from light in said unidirectional ring; and input means for receiving an input beam of light into said ring to pump the laser.

59. A lager resonator as in claim 58 wherein gout means for achieving unidirectional single frequency lasing further comprises means for causing Faraday rotation to act on a linearly polarized optical beam in said first or second piece to enhance accumulation of rotation of the plane of polarization of said counter-rotating optical beam.

60. A laser resonator as in claim 58 wherein gout second piece hag greater Faraday rotation constant than said first piece.

61. A lager resonator as in claim 58 wherein said second piece has a lower light absorption coefficient in the lasing spectral regime than said first piece.

62. The lager resonator of claim 58 wherein said at least four non-coplanar vertices comprise:

at least two refraction vertices located near the interface between at least one of said pieces and said gap; and at least two reflection vertices each located in the path of said optical beam between said two refraction vertices.

63. The laser resonator of claim 62 wherein said two refraction vertices are tilted such that the plane including the incident beams does not coincide with the plane including the refracted beams.

64. The laser ring resonator of claim 58 wherein said at least four non-coplanar vertices comprises:

at least two refection vertices located near the interface between at least one of said pieces and said gap; and at least two reflection vertices, each located in said path of said optical beam between said two reflection vertices.

65. The laser resonator of claims 62 or 64 wherein said at least two reflection vertices comprises at least one reflection in said second piece and one reflection in said first piece.

66. The laser resonator of claims 62 or 64 wherein said at least one reflection vertice comprises one or more total internal reflections or plain reflections that introduce total retardation among two orthogonal polarization components which is close to 180 degrees.

67. The laser resonator of claims 62 or 64 wherein at least one of said reflections is partially transmissive at said laser lasing wavelength and serves as an output coupler.

68. The laser resonator of claims 62 or 64 wherein at least one of said reflections is partially transmissive at the laser pump wavelength and serves as an input pump light coupler.

69. The laser resonator of claims 62 or 64 wherein at least one of said reflection vertices is capable of suppressing undesired components of said optical beam by having higher transmission for unwanted emission spectra wavelengths and/or unwanted polarizations.

70. The laser resonator of claim 64 wherein said two reflection vertices are tilted such that the plane including the incident beams does not coincide with the plane including the reflected beams.

71. The laser resonator of claim 70 wherein said two reflections comprise total internal reflections.

72. The laser resonator of claim 58 wherein said means for achieving unidirectional single frequency lasing comprises means for achieving isolation between the counterrotating and rotating optical beams and suppression of one of said rotating and counter-rotating optical beams by arranging the polarization modifying elements in said first and second pieces in the following sequence:

| | |
|---|---|
| first: | Partial reflection output mirror; |
| second: | Faraday rotation acting on linearly polarized beam; |
| third: | Polarizer at the piece interface; |
| fourth: | Refraction or and reflection; |
| fifth: | Faraday rotation acting on elliptically polarized beam; |
| sixth: | Reflection or reflections; |
| seventh: | Faraday rotation acting on elliptically polarized beam; |
| eighth: | Reflection or and refraction; |
| ninth: | Polarizer at the piece interface; |
| tenth: | Faraday rotation acting on linearly polarized beam. |

73. The laser resonator of claim 72 wherein said gap is inserted in regions defined before the fourth and after the eighth sequences.

74. The laser resonator of claim 73 wherein said gap further comprises a polarizing element.

75. The laser resonator of claim 74 wherein said polarizing element comprises a Brewster surface.

76. The laser resonator of claim 58 wherein the combination of elliptical retarders, Faraday non-reciprocal rotators, inversions, reciprocal rotators, and polarizers generate non-reciprocal frequency shifts and differential losses between said rotating and counter-rotating optical beams to improve suppression of said counter-rotating optical beam and improve decoupling of energy between said rotating and counterrotating optical beams.

77. The laser resonator of claim 76 wherein the non-reciprocal frequency shifts create separation of the frequencies of said rotating and counter-rotating optical beams, thereby enhancing the frequency purity and amplitude stability of said output laser beam by enhancing the isolation against backreflected light coupling back into said ring in the direction of rotation of said counter-rotating optical beam.

78. The laser resonator of claim 58 wherein said at least one polarizing selective element comprises one or more coatings on one or more of:

said reflection vertices;
said refraction vertices;
the surfaces facing said gap; or
Brewster surfaces facing said gap.

79. The laser resonator of claim 58 wherein said means for generating a magnetic field comprises a magnet or electro-magnet for applying a magnetic field substantially in the direction defined mainly along the path of the optical beam propagating within said ring in a substantial part of the path of said optical beam inside at least one of said pieces.

80. The laser resonator of claim 58 wherein said means for extracting an output laser beam comprises an output mirror located at a reflection point in one of said pieces or at a refraction point in a vertice near said gap.

81. The laser resonator of claim 58 wherein said input means comprises:
a laser diode or laser diode array emitting in the absorption band of said lasing material; and
a coupling surface in said first piece where the pump light is coupled collinearly with said optical beam.

82. The laser resonator of claim 58 further comprising means for varying the optical length of said ring, thereby tuning the laser frequency.

83. The laser resonator of claim 82 wherein said means for varying the optical path length comprises means for varying the width of said gap.

84. The laser resonator of claim 82 wherein said means for varying comprises a piezo electric transducer attached to at least one of said pieces.

85. The laser resonator of claim 82 further comprising means for generating a variable magnetic field for magneto-optic frequency tuning.

86. The laser resonator of claim 85 wherein said magneto-optic frequency tuning is achieved by applying a variable magnetic field along the path of said optical beam to change the Faraday rotation acting on an elliptically polarized optical beam thereby changing the optical path length of said rotating optical beam relative to gout counter-rotating optical beam.

87. The laser resonator of claim 86 wherein said second piece comprises constant highly transparent material having a high Verdet constant and said frequency tuning of an elliptically polarized optical beam occurs in said second piece.

88. The laser resonator of claim 85 wherein said means for generating a variable magnetic field provides magnetic flux along the path of said optical beam, said magnetic flux being tuned by changing the strength of said magnetic field or changing the location of said means for generating a magnetic field relative to said magneto optic material.

89. The laser resonator of claim 88 further comprising electro mechanical means to cause said change of location.

90. The laser resonator of claim 89 wherein said electro mechanical means comprises a Piezo Electric Transducer.

91. The laser resonator of claim 82 further comprising an Electro-Optic frequency tuning element.

92. The laser resonator of claim 91 wherein said Electro-Optic frequency tuning element serves as part of said ring, and said laser resonator further comprises means for applying an adjustable electric field to said Electro-Optic frequency tuning element in order to change the optical path length of said ring thereby tuning said laser frequency.

93. The laser resonator of claim 92 wherein one of said first and second pieces comprises non-lasing material comprising an Electro-Optic frequency tuning element, whereby an applied electrical field changes the optical path length of said ring in the region traversed by elliptically polarized optical beam, thereby changing the state of polarization of said optical beam and tuning the frequency of said optical beam.

94. The laser resonator of claim 82 further comprising an Elasto-Optic frequency tuning element.

95. The laser resonator of claim 94 wherein said Elasto-Optic frequency tuning element forms part of said ring and said laser further comprises means coupled to said Elasto-Optic frequency tuning element for receiving an electric field and in response thereto stressing said elasto-optic frequency tuning element, thereby changing the path length of said ring, thereby tuning said laser frequency.

96. The laser resonator of claim 95 wherein said laser material also has elasto-optic properties and serves as said Elasto-Optic tuning element.

97. The laser resonator of claim 95 wherein one of said first and second pieces comprises non-lasing material comprising an Elasto-Optic frequency tuning element, whereby an applied electrical field changes the optical path length of said ring in a region traversed by an elliptically polarized optical beam, thereby changing the state of polarization of said elliptically polarized optical beam and tuning the frequency of said laser.

98. The laser resonator of claim 97 wherein said Elasto-Optic frequency tuning element further comprises an electro-mechanical material such that an applied electrical field tunes the refractive index of at least one of its optical axes, thereby tuning the optical path length of said ring.

99. The laser resonator of claim 58 further comprising a semiconductor laser diode or semiconductor laser diode array arranged to pump said laser.

100. The laser resonator of claim 99 wherein said semiconductor laser diode or laser diode array provides pump light coupled into said ring collinearly with said optical beam via at least one of said reflection or refraction vertices.

101. The laser resonator of claim 99 wherein said optical beam, travels in a zig zag path in said laser material, gout lager material provides a multiplicity of reflection points, and said pump light is coupled collinearly with said optical beam at said reflection points.

102. The laser resonator of claim 101 wherein at least some of said reflection points are located at intervals which match the intervals between the emitting facets of a plurality of broad area laser diodes or laser diode arrays.

103. The laser resonator of claim 99 wherein said pump light from said laser diode or laser diode array is coupled collinearly with said optical beam through at least one of said vertices and additional pump light is coupled non collinearly with said optical beam.

104. The laser resonator of claim 99 wherein part of said pump light is coupled continuously to maintain above threshold lasing and additional pulsed pump light is coupled to said ring to provide high peak output power.

105. The laser resonator of claim 99 further comprising temperature control means for adjusting and stabilizing the emitting spectrum of the laser diode or laser diode array to the absorption band of said lasing material.

106. The laser resonator of claim 58 wherein said output means for extracting an output laser beam comprises one or more reflection or refraction vertices where said laser light is coupled out of said ring.

107. The laser resonator of claim 58 further comprising temperature control means for adjusting and stabilizing the emitting spectrum of said lasing material.

108. The laser resonator of claims 105 or 107 wherein said temperature control means comprises a Thermo-Electric cooler.

109. The laser resonator of claim 58 wherein said first piece is placed adjacent said second piece.

110. The laser of claim 109 wherein said gap is filled with a third material having an index of refraction selected to minimize loss.

111. The laser resonator of claim 110 wherein said third material comprises optical cement.

112. The laser resonator of claim 58 wherein said second piece comprises a plurality of separate pieces.

113. The laser resonator of claim 112 wherein said plurality of pieces comprise tilted mirrors which form a noncoplanar or a planar ring resonator.

114. The laser resonator of claim 58 further comprising one or more frequency tuning elements selected from the group of frequency tuning elements consisting of magneto optic, electro optic, elasto optic, thermal, and mechanical tuning elements.

115. A solid state non-monolithic unidirectional ring laser, for providing a single frequency laser beam comprising:
- a first piece comprising a material capable of lasing;
- a second piece, separated by a gap of width Wg from said first piece, said second piece comprising non-lasing material;
- one or more retardation plates located between said first piece and second piece;
- means for defining, within a region consisting of said first and second pieces, said one or more retardation plates, and said gap, a resonant unidirectional ring comprising:
  - at least three planar or four non-coplanar vertices which comprise either:
    - at least three reflection vertices; or
    - at least two refraction vertices and two reflection vertices;
  - means for achieving unidirectional single frequency lasing by enhancing the cavity loss of a counter-rotating optical beam comprising means for causing Faraday rotation on an elliptically polarized optical beam in said second piece to enhance frequency separation between a rotating optical beam and said counter-rotating optical beam, and transforming means to convert an elliptically polarized optical beam to a linearly polarized optical beam and vice versa; and
- at least one polarization selective element to discriminate against said counter-rotating beam;
- means for generating a magnetic field to activate Faraday rotation in said pieces;
- output means for extracting an output laser beam from light in said unidirectional ring comprising an output mirror at one of said vertices; and
- input means for receiving an input beam of light into said ring to pump the laser, comprising a laser diode or laser diode array emitting in the absorption band of said lasing material.

116. A laser resonator as in claim 115 wherein said means for achieving unidirectional single frequency lasing further comprises means for causing Faraday rotation to act on a linearly polarized optical beam in said first or second piece to enhance accumulation of rotating of the plane of polarization of gout counter-rotating optical beam.

117. The laser resonator of claim 115 wherein said second piece has magneto-optic properties having Faraday rotation properties and a weak light absorption coefficient in the lasing spectral regime.

118. The laser resonator of claim 117 wherein said retardation plates rotate the plane of polarization of said optical beam to compensate for the Faraday rotation acting on said rotating optical beam while accumulating rotation for said counter-rotating optical beam.

119. The laser resonator of claim 118 wherein said retardation plates are made of multiple quarter wavelength retardation plates.

120. The laser resonator of claim 115 wherein said retardation plates transform a linear polarized optical beam in said first piece to an elliptically polarized optical beam in said second piece, and vice-versa.

121. The laser resonator of claim 120 wherein said retardation plates comprise a first part acting on said optical beam traveling from said first piece to said second piece and a second part acting on said optical beam traveling from said second piece to said first piece, said first and second parts oriented to compensate for the Faraday rotation of said rotating optical beam.

122. The laser resonator of claim 115 further comprising means for varying the optical length of said ring thereby tuning the laser frequency.

123. The laser resonator of claim 122 wherein said means for varying the optical path length comprises means for varying the width of said gap.

124. The laser resonator of claim 122 wherein said means for varying comprises a piezo electric transducer attached to at least one of said pieces.

125. The laser resonator of claim 115 further comprising means for generating a variable magnetic field for magneto-optic frequency tuning.

126. The laser resonator of claim 125 wherein said magneto-optic frequency tuning is achieved by applying a variable magnetic field along the path of said optical beam to change the Faraday rotation acting on an elliptically polarized optical beam thereby changing the optical path length of said rotating optical beam relative to said counter-rotating optical beam.

127. The laser resonator of claim 126 wherein gout second piece comprises highly transparent material having a high Verdet constant and said frequency tuning of an elliptically polarized optical beam occurs in said second piece.

128. The laser resonator of claim 125 wherein said means for generating a variable magnetic field provides magnetic flux along the path of said optical beam, said magnetic flux being tuned by changing the strength of the magnetic field or changing the location of said means for generating a magnetic field relative to said magneto optic material.

129. The laser resonator 128 further comprising electro mechanical means to cause said change of location.

130. The laser resonator of claim 129 wherein said electro mechanical means comprises a Piezo Electric Transducer.

131. The laser resonator of claim 115 further comprising an Electro-Optic frequency tuning element.

132. The laser resonator of claim 131 wherein said Electro-Optic frequency tuning element serves as part of said ring and said laser resonator further comprises means for applying an adjustable electric field to said Electro-Optic frequency tuning element in order to change the optical path length of said ring thereby tuning said laser frequency.

133. The laser resonator of claim 132 wherein one of gout first and second pieces comprises non-lasing material comprising an Electro-Optic frequency tuning element, whereby an applied electrical field changes the optical path length of said ring in the region traversed by an elliptically polarized optical beam, thereby changing the state of polarization of said optical beam and tuning the frequency of said optical beam.

134. The laser resonator of claim 115 further comprising an Elasto-Optic frequency tuning element.

135. The laser resonator of claim 134 wherein said Elasto-Optic frequency tuning element forms part of said ring and said lager further comprises means coupled to said Elasto-Optic frequency tuning element for receiving an electric field and in response thereto stressing said Elasto-Optic frequency tuning element, thereby changing the path length of said ring, thereby tuning said laser frequency.

136. The laser resonator of claim 135 wherein said laser material also has elasto-optic properties and serves as said Elasto-Optic tuning element.

137. The laser resonator of claim 135 wherein one of said first and second pieces comprises non-lasing material comprising an Elasto-Optic frequency tuning element, whereby an applied electrical field changes the optical path length of said ring in a region traversed by an elliptically polarized optical beam, thereby changing the state of polarization of said elliptically polarized optical beam and tuning the frequency of said laser.

138. The laser resonator of claim 137 wherein said Elasto-Optic frequency tuning element further comprises an electro-mechanical material such that an applied electric field tune the refractive index of at least one of its optical aYes thereby tuning the optical path length of said laser.

139. The laser resonator of claim 115 further comprising a semiconductor laser diode or semiconductor laser diode array arranged to pump said laser.

140. The laser resonator of claim 139 wherein said semiconductor lager diode or laser diode array provides pump light coupled into said ring collinearly with said optical beam via at least one of said reflection or refraction vertices.

141. The laser resonator of claim 139 wherein said optical beam travels in a zig zag path in said laser material, said laser material provides a multiplicity of reflection points, and said pump light is coupled collinearly with said optical beam at said reflection points.

142. The laser resonator of claim 141 wherein at least some of said reflection points are located at intervals which match the intervals between the emitting facets of a plurality broad area laser diodes or laser diode arrays.

143. The laser resonator of claim 139 wherein said pump light from said laser diode or laser diode array is coupled collinearly with said optical beam through at least one of said vertices and additional pump light is coupled non collinearly with said optical beam.

144. The laser resonator of claim 139 wherein part of said pump light is coupled continuously to maintain above threshold lasing and additional pulsed pump light is coupled to said ring to provide a high peak output power.

145. The laser resonator of claim 115 wherein said output means for extracting an output laser beam comprises one or more reflection or refraction vertices where said laser light is coupled out of said ring.

146. The laser of claim 139 further comprising temperature control means for adjusting and stabilizing the emitting spectrum of the laser diode or laser diode array to the absorption band of said lasing material.

147. The laser of claim 115 further comprising temperature control means for adjusting and stabilizing the emitting spectrum of the lasing material.

148. The laser of claims 146 or 147 wherein said temperature control means comprises a Thermo-Electric cooler.

149. The laser resonator of claim 115 wherein said first piece is placed adjacent said second piece.

150. The laser of claim 149 wherein said gap is filled with a third material having an index of refraction selected to minimize loss.

151. The laser resonator of claim 150 wherein said third material comprises optical cement.

152. The laser resonator of claim 115 wherein said second piece comprises a plurality of separate pieces.

153. The laser resonator of claim 152 wherein said plurality of pieces comprise tilted mirrors which form a noncoplanar or a planar ring resonator.

154. The laser resonator of claim 115 further comprising one or more frequency tuning elements selected from the group of frequency tuning elements consisting of magneto optic, electro optic, elasto optic, thermal, and mechanical tuning elements.

* * * * *

UNITED STATES PATENT AND TRADEMARK OFFICE
CERTIFICATE OF CORRECTION

PATENT NO. : 5,148,444
DATED : September 15, 1992
INVENTOR(S) : Josef Berger

It is certified that error appears in the above-indentified patent and that said Letters Patent is hereby corrected as shown below:

Claim 24, Column 13, line 67, delete "ElastoOptic" and insert —Elasto-Optic—.
Claim 32, Column 14, line 57, after "plane" insert —of—.
Claim 33, Column 14, line 67, after "plane" insert —of—.
Claim 34, Column 13, line 5, delete "gout" and insert —said—; line 8 after "plane" insert —of—; line 8, delete "gout" and insert —said—; line 11, delete "gout".
Claim 36, Column 15, line 27, delete "Refraction" and insert —Refractions—; line 28, Column 15, delete "Reflection" and insert —Reflections—; line 30, delete Refraction" and insert —Refractions—;
Claim 59, Column 17, line 17, delete "lager" and insert —laser—; line 17, delete "gout" insert —said—.
Claim 60, Column 17, line 24, delete "gout" and insert —said—; line 24 delete "hag" and insert —has—.
Claim 61, Column 17, line 27, delete "lager" and insert —laser—.
Claim 84, column 19, line 20, after "transducers" insert --(PZT)--;
Claim 90, column 19, line 49, after "Transducer" insert --(PZT)--;
Claim 101, column 20, line 36, delete "gout" and insert --said--; line 36, delte "lager" and insert --laser--;
Claim 109, column 21, line 2, after "adjacent" insert --to--;
Claim 124, column 22, line 28, before "attached" insert --(PZT)--;
Claim 127, column 22, line 39, delete "gout" and insert --said--;
Claim 130, column 22, line 55, after "Transducer" insert --(PZT)--;
Claim 133, column 22, line 66, delete "gout" and insert --said--;
Claim 135, column 23, line 9, delete "lager" and insert --laser--;
Claim 138, column 23, delete "aYes" and insert --axis--;

UNITED STATES PATENT AND TRADEMARK OFFICE
CERTIFICATE OF CORRECTION

PATENT NO. : 5,148,444
DATED : September 15, 1992
INVENTOR(S) : Josef Berger

It is certified that error appears in the above-indentified patent and that said Letters Patent is hereby corrected as shown below:

Claim 149, column 24, line 29, after "adjacent" insert --to--;

Signed and Sealed this

Thirty-first Day of May, 1994

BRUCE LEHMAN

Attest:

Attesting Officer

Commissioner of Patents and Trademarks